United States Patent [19]
Lawrence et al.

[11] 3,899,418
[45] Aug. 12, 1975

[54] MINER'S PAN

[76] Inventors: Manuel P. Lawrence, 633 Highland St.; Kenneth F. Jacobson, P.O. Box 1764, both of Carson City, Nev. 89701

[22] Filed: Sept. 24, 1973

[21] Appl. No.: 400,411

[52] U.S. Cl. .................................................. 209/447
[51] Int. Cl.² ............................................ B03B 3/00
[58] Field of Search ........... 209/447, 422, 490, 494, 209/437, 438, 439, 479, 506, 194, 174, 43, 209/485

[56] References Cited
UNITED STATES PATENTS

| | | | |
|---|---|---|---|
| 585,989 | 7/1897 | Sletcher | 209/447 |
| 618,918 | 2/1899 | Stoodley | 209/447 |
| 1,292,364 | 1/1919 | Ord | 209/447 |
| 1,948,797 | 2/1934 | Nicolai | 209/447 |
| 2,630,226 | 3/1953 | Streng | 209/447 |
| 3,059,776 | 10/1962 | Smith | 209/447 |
| 3,407,933 | 10/1968 | Klein | 209/447 |

Primary Examiner—Frank W. Lutter
Assistant Examiner—Gregory N. Clements
Attorney, Agent, or Firm—Harris Zimmerman

[57] ABSTRACT

A pan for separating gold or other precious heavy metals from wet sand or gravel includes a gently concaved round bottom joined to obliquely rising sides at the circumference. Depending from the center of the bottom of the pan is a mineral trap, of V-shaped cross-section and arcuate profile, which is formed integrally with the bottom and extends diametrically therealong. Extending from one end of the trap is a groove, depressed in the pan bottom along the diametrical line of the trap, which facilitates separating the heavy metal particles from the dross and conducts them toward the trap, where they are collected. The pan may be formed of clear plastic material, permitting the mineral retrieval of each panning attempt to be seen through the pan bottom prior to the painstaking step of removing the sand and gravel from atop the retrieved materials.

5 Claims, 6 Drawing Figures

PATENTED AUG 12 1975  3,899,418
FIG_1
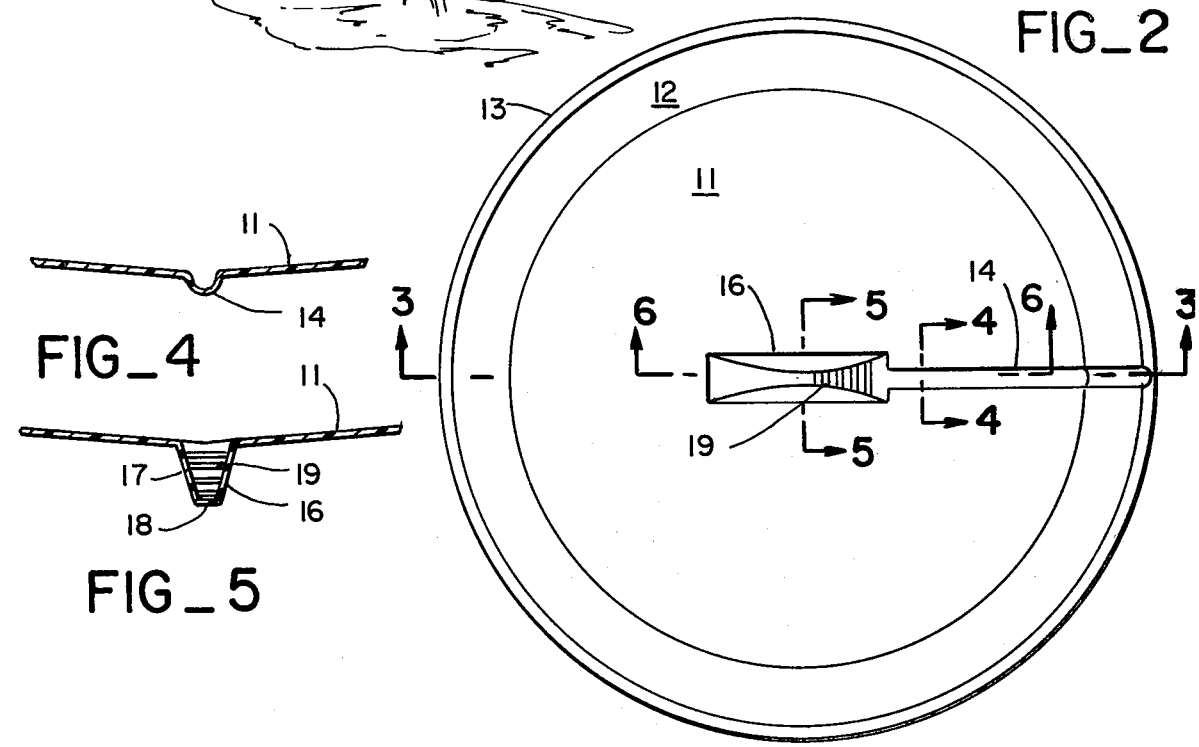
FIG_2
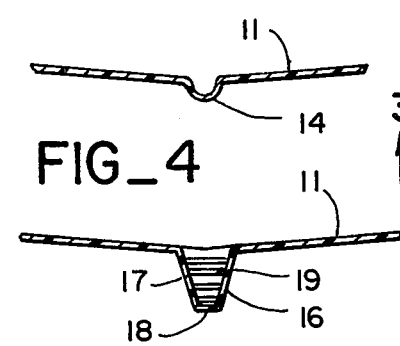
FIG_4
FIG_5
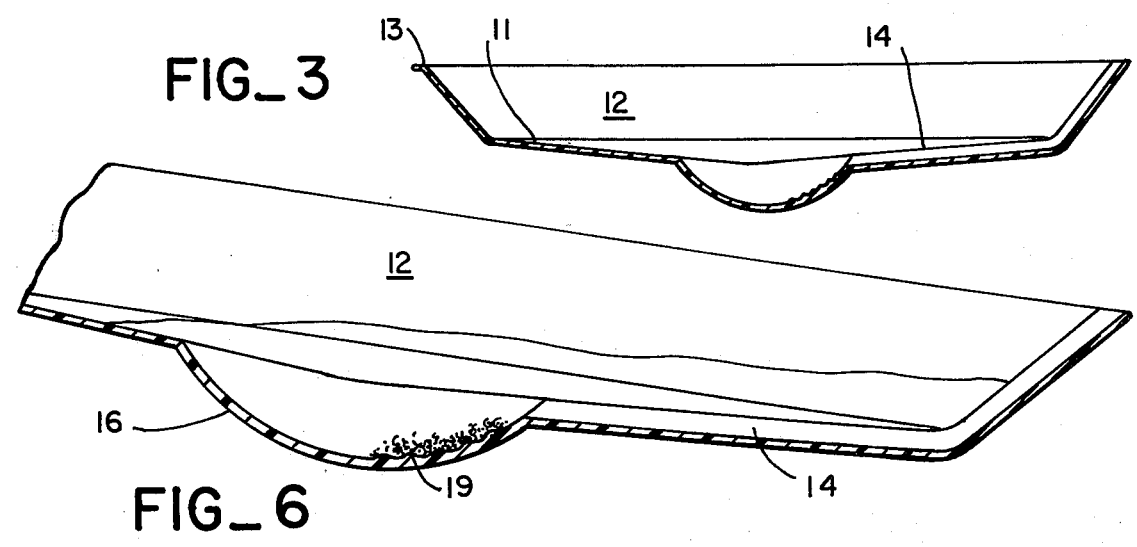
FIG_3
FIG_6

MINER'S PAN

BACKGROUND OF THE INVENTION

The following patents have been deemed pertinent as exemplifying the prior art closest to the present invention:

618,918 Stoodley;
1,292,364 Ord;
1,948,797 Nicolai;
2,630,226 Streng;
3,059,776 Smith.

All of the enumerated patents disclose improved forms of gold pans. Stoodley, Ord, Nicolai and Streng disclose gold pans which include some form of recess or depression in the bottom of the pan. In the Stoodley and Nicolai devices, however, the recess in the bottom is used to retain material which first passes through a sieve or strainer disposed higher up in the pan. The Streng pan employs a convex bottom to urge the heavy metal particles toward a circumferentially disposed cup and funnel assembly. The miner's pan or Ord includes a concave bottom but no mineral trap, and is directed toward use as a spinning pan to be hung from a pivot. In the disclosure of Smith, the gold pan has a flat bottom and no mineral trap, but does teach the use of grooves or riffles in the side of the pan to increase the rate of separation of the heavy materials from the wet residuum. In sum, the prior art teaches minor improvements in the legendary miner's pan, but does not indicate any means of increasing the rate of separation of heavy metal from residue while simultaneously trapping the metal particles. Furthermore, the prior art pans are antiquated in that they do not take advantage of contemporary materials and fabrication techniques.

SUMMARY OF THE PRESENT INVENTION

The miner's pan of the present invention is formed of oblique sides rising from the circumference of a shallowly concaved round bottom. Fabricated of clear plastic material, the pan has formed integrally in the bottom a separating groove to hasten precipitation of the heavy metal particles, combined with a trap to retain the separated particles and prevent their loss during removal of the residuum. The groove is a linear depression in the bottom extending radially from adjacent the periphery of the pan inward to the mineral trap disposed substantially centrally in the bottom. The trap comprises a deepened groove of V-shaped cross-section and arcuate profile extending diametrically colinear with the separating groove. The surface of the trap adjacent to the separating groove is serrated to prevent mineral particles from leaving the trap during washing. Because the pan is fabricated integrally of thermoplastic, all of its enumerated features may be included with relative ease in production and concomitant low cost. Furthermore, the thermoplastic material is transparent, permitting the miner to ascertain visually the amount of mineral recovered before undertaking the painstaking final step of removing the residual sand and gravel from atop the retained heavy metal particles.

THE DRAWING

FIG. 1 is a depiction of the present invention in use.

FIG. 2 is a top view of the miner's pan of the present invention.

FIG. 3 is a cross-sectional view taking along line 3—3 of FIG. 2.

FIG. 4 is a cross-sectional view taken along line 4—4 of FIG. 2.

FIG. 5 is a cross-sectional view taken along line 5—5 of FIG. 2.

FIG. 6 is a cross-sectional view taken along line 6—6 of FIG. 2.

DESCRIPTION OF THE PREFERRED EMBODIMENT

The miner's pan of the present invention comprises a circular bottom 11 of shallow concave cross-section, to which an obliquely rising side 12 with a lip 13 is integrally formed. Extending radially along the bottom is a separating groove 14, which is a linear, shallow, narrow depression, as shown in FIG. 4. One end of the separating groove opens into a mineral trap 16, which extends colinearly with the groove 14 and is centrally and integrally formed in the bottom. The other end of the groove extends along the side 12 to the upper end thereof. The mineral trap includes sides 17, in a V disposition, joining an arcuate bottom 18. The bottom 18 tapers upwardly from the trap 16 towards the sides 12 at an angle of about 5°.

In the bottom 18 adjacent the groove 14 are transverse ridges 19.

The entire pan of the present invention is integrally formed of clear transparent plastic material by vacuum molding or the like. Because the material is transparent, the miner can see into the trap, as in FIG. 6, to determine the progress of the panning operation and to ascertain the amount of mineral particles retrieved. Also, the transparent plastic is light and resilient, and may be fabricated easily and economically.

To use the miner's pan, the separating groove is held away from the body and toward the water, as shown in FIG. 1. The pan is filled approximately three-quarters full with sand and/or gravel containing heavy metal particles such as gold nuggets and flakes. The pan is submerged completely under water, and shaken from side to side with a circular motion. The swirling of the sand and gravel over the separating goove will cause the gold particles to settle in the groove and migrate toward the mineral trap. Next, any rocks and large debris are removed from the pan. The pan is then shaken with a forward and backward motion, tipping the pan forward until the gravel starts to spill out over the front edge. The pan is lifted out of the water slowly, allowing the water to run off and wash the light surface materials away. At the same time, the pan is rocked forward and backward, causing the gold and other minerals present to settle in the trap and be retained in the grooves. The miner may then ascertain the fruits of his labors by raising the pan overhead and visually checking the amount of mineral recovered. If the miner's efforts have been productive, he will then carefully remove the remaining sand and gravel and collect the gold particles by pouring the same out from the upper end of the groove 14. If no gold is seen in the trap, the miner may skip this last step and start the procedure anew with a new ore sample.

In sum, the present invention enjoys the following advantages over the prior art miner's pans:

1. The separating groove hastens the precipitation of gold particles from the sand and gravel;

2. The mineral trap retains the gold particles during the separating procedures and increases the total yield;

3. The transparency of the pan material allows the miner to visually check his/her progress and avoid unnecessary labor;

4. The plastic material of the pan is light and easily wielded, and may be fabricated easily and economically.

We claim

1. A device for separating heavy precious metals from a placer material comprising a pan having a generally circular bottom and an upwardly and outwardly extending side wall formed integrally therewith, an upwardly opening trap formed centrally and comprising a depression in said bottom, a groove disposed in said bottom and said side wall communicating with and extending substantially from said trap to the lip of said side wall for hastening the separation and retrieval of said precious metals from said placer material.

2. The device of claim 1 wherein said depression has two longitudinal sides depending in a V relationship from said bottom and joined by an arcuate trap bottom surface.

3. The device of claim 2 further including serrations in said trap bottom surface adjacent to said groove to entrap said heavy precious metals.

4. The device of claim 1 wherein said pan is fabricated of transparent material to facilitate visual inspection of panning progress.

5. A device for separating heavy precious metals from a placer material, comprising a pan having a generally circular bottom and an upwardly and outwardly extending side wall, a groove extending radially in said bottom and extending substantially to the lip of said side wall for hastening the separation of said precious metals from said placer materials, an upwardly opening trap formed centrally in said bottom and communicating with said groove, said trap comprising a depression in said bottom, said depression having two longitudinal sides depending in a V relationship from said bottom and joined by an arcuate trap bottom.

* * * * *